US012233879B2

(12) United States Patent
Kawamura et al.

(10) Patent No.: US 12,233,879 B2
(45) Date of Patent: Feb. 25, 2025

(54) VEHICLE-INTERIOR MONITORING APPARATUS

(71) Applicant: SUBARU CORPORATION, Tokyo (JP)

(72) Inventors: Kousei Kawamura, Tokyo (JP); Tomoya Kanagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 331 days.

(21) Appl. No.: 17/744,990

(22) Filed: May 16, 2022

(65) Prior Publication Data

US 2022/0379898 A1 Dec. 1, 2022

(30) Foreign Application Priority Data

May 28, 2021 (JP) .................................. 2021-089848

(51) Int. Cl.
*B60W 40/08* (2012.01)
*B60Q 9/00* (2006.01)
*G01S 13/04* (2006.01)
*G01S 13/88* (2006.01)

(52) U.S. Cl.
CPC ............... *B60W 40/08* (2013.01); *B60Q 9/00* (2013.01); *G01S 13/04* (2013.01); *G01S 13/88* (2013.01); *B60W 2040/0881* (2013.01)

(58) Field of Classification Search
CPC ........... B60W 2040/0881; B60W 40/08; G01S 13/00; G01S 13/56; G01S 13/88; B60R 21/0132; B60R 21/01536; B60R 21/01542
See application file for complete search history.

(56) References Cited

U.S. PATENT DOCUMENTS

| 8,152,198 B2 * | 4/2012 | Breed | ............... B60R 21/01516 |
| | | | 701/45 |
| 10,404,308 B1 * | 9/2019 | Alameh | ................. H01Q 1/245 |
| 2002/0140215 A1 * | 10/2002 | Breed | .................. B60N 2/2863 |
| | | | 280/735 |

(Continued)

FOREIGN PATENT DOCUMENTS

| JP | 2020-101415 A | | 7/2020 |
| JP | 2020142718 A | * | 9/2020 |

*Primary Examiner* — Logan M Kraft
*Assistant Examiner* — Joshua Campbell
(74) *Attorney, Agent, or Firm* — Rimon P.C.

(57) ABSTRACT

A vehicle-interior monitoring apparatus for a vehicle includes a millimeter-wave sensor, a determiner, and a movement sensor. The millimeter-wave sensor outputs a millimeter radio wave toward a vehicle cabin of the vehicle and detects a millimeter reflection wave from an in-vehicle object including either one of an occupant and baggage in the vehicle cabin. The determiner determines a type of the in-vehicle object based on a detection level of the detected millimeter reflection wave. The movement sensor detects movement of the vehicle. The determiner re-determines that a determined in-vehicle object is either one of the baggage and a child as the occupant based on a positional change of the determined in-vehicle object upon the movement sensor detecting the movement of the vehicle, the determined in-vehicle object being the in-vehicle object of which the determiner has determined the type based on the detection level of the millimeter reflection wave.

6 Claims, 9 Drawing Sheets

(56) References Cited

U.S. PATENT DOCUMENTS

| | | | | |
|---|---|---|---|---|
| 2005/0000748 | A1* | 1/2005 | Link | B60R 21/0132 |
| | | | | 180/282 |
| 2007/0280505 | A1* | 12/2007 | Breed | B60W 40/08 |
| | | | | 382/104 |
| 2016/0375797 | A1* | 12/2016 | Hosokawa | B60N 2/0026 |
| | | | | 701/1 |
| 2018/0272977 | A1* | 9/2018 | Szawarski | B60R 11/04 |

* cited by examiner

ACCELERATION

VEHICLE-INTERIOR MONITORING APPARATUS

CROSS-REFERENCE TO RELATED APPLICATIONS

The present application claims priority from Japanese Patent Application No. 2021-089848 filed on May 28, 2021, the entire contents of which are hereby incorporated by reference.

BACKGROUND

The disclosure relates to vehicle-interior monitoring apparatuses in vehicles.

A vehicle, such as an automobile, allows occupants, including a driver and a passenger, to board the vehicle and sit in seats inside a vehicle cabin (vehicle compartment), and travels in accordance with any one of a driving operation by the driver, a driving support mode, and an automated driving mode. Various power sources have been developed for such vehicles and include, for example, an internal combustion engine that burns either of gasoline and ethanol, an electric motor that uses stored electric power, and a power source that uses hydrogen. For example, see Japanese Unexamined Patent Application Publication (JP-A) No. 2020-101415 and JP-A No. 2020-142718.

SUMMARY

An aspect of the disclosure provides a vehicle-interior monitoring apparatus for a vehicle. The vehicle-interior monitoring apparatus includes a millimeter-wave sensor, a determiner, and a movement sensor. The millimeter-wave sensor is configured to output a millimeter radio wave toward a vehicle cabin of the vehicle and detect a millimeter reflection wave from an in-vehicle object including either one of an occupant in the vehicle cabin of the vehicle and baggage in the vehicle cabin of the vehicle. The determiner is configured to determine a type of the in-vehicle object in the vehicle cabin of the vehicle based on a detection level of the millimeter reflection wave detected by the millimeter-wave sensor. The movement sensor is configured to detect movement of the vehicle. The determiner is configured to re-determine that a determined in-vehicle object is either one of the baggage and a child as the occupant based on a positional change of the determined in-vehicle object upon the movement sensor detecting the movement of the vehicle, the determined in-vehicle object being the in-vehicle object of which the determiner has determined the type based on the detection level of the millimeter reflection wave.

An aspect of the disclosure provides a vehicle-interior monitoring apparatus for a vehicle. The vehicle-interior monitoring apparatus includes a millimeter-wave sensor, a movement sensor, and circuitry. The millimeter-wave sensor is configured to output a millimeter radio wave toward a vehicle cabin of the vehicle and detect a millimeter reflection wave from an in-vehicle object including either one of an occupant in the vehicle cabin of the vehicle and baggage in the vehicle cabin of the vehicle. The movement sensor is configured to detect movement of the vehicle. The circuitry is configured to determine a type of the in-vehicle object in the vehicle cabin of the vehicle based on a detection level of the millimeter reflection wave detected by the millimeter-wave sensor. The circuitry is configured to re-determine that a determined in-vehicle object is either one of the baggage and a child as the occupant based on a positional change of the determined in-vehicle object upon the movement sensor detecting the movement of the vehicle, the determined in-vehicle object being the in-vehicle object of which the determiner has determined the type based on the detection level of the millimeter reflection wave.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
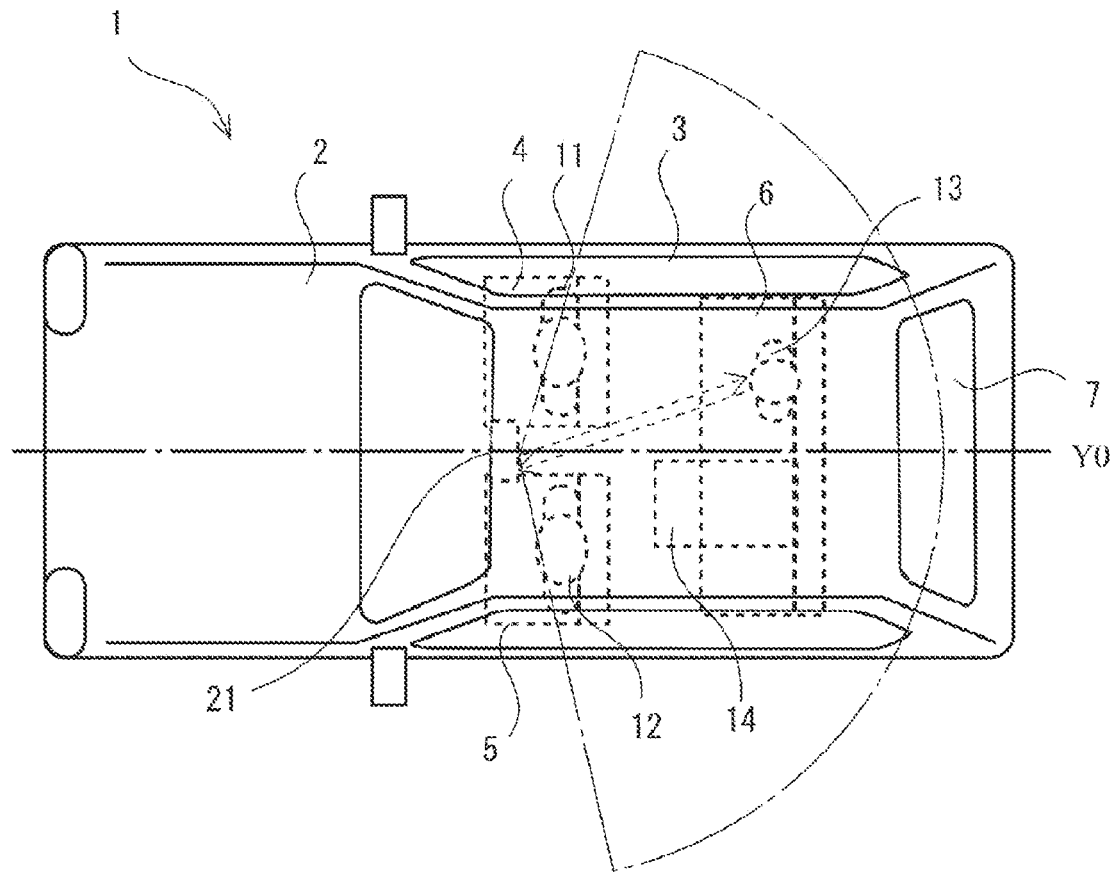
FIG. 1 is a plan view schematically illustrating an automobile to which a vehicle-interior monitoring apparatus according to an embodiment of the disclosure is applied.

It is desirable that a vehicle, such as an automobile, detects in-vehicle objects, such as occupants and baggage, inside the vehicle cabin, and monitors the states thereof.

In particular, when the vehicle is to travel in an automated driving mode, the state of each in-vehicle object in the vehicle cabin is to be monitored during the automated driving mode.

In JP-A No. 2020-101415 and JP-A No. 2020-142718, a radio wave, such as a millimeter wave, is radiated, and a reflection wave thereof is detected, whereby the state of each occupant is detected.

Furthermore, JP-A No. 2020-142718 discloses a function for detecting an infant left behind unattended in a vehicle.

However, when a millimeter radio wave is used in this manner to determine the type of in-vehicle object, such as either of an occupant and baggage, inside the vehicle cabin of the vehicle based on the detection level of a millimeter reflection wave, the reflection-wave detection level is not necessarily clearly divided for each type of in-vehicle object. Thus, it may possibly be difficult to accurately determine the type of the detected in-vehicle object. In particular, the difference between the detection level of a millimeter reflection wave from a child including an infant and the detection level of a millimeter reflection wave from baggage basically tends to be small. Because the detection level of a millimeter reflection wave from an occupant, such as an adult, is basically higher than the detection level of a millimeter reflection wave from baggage, a clear distinction is possible. However, the detection level of a millimeter reflection wave from a child, such as an infant, may sometimes be lower than the detection level of a millimeter reflection wave from baggage. For example, the detection level of a millimeter reflection wave from transparent-liquid-containing baggage, such as a plastic bottle containing a liquid, may sometimes be higher than the detection level of a millimeter reflection wave from a child, such as an infant. In this case, depending on the set threshold value, the plastic bottle containing the liquid may erroneously be determined to be a child, or the possibility of the child being erroneously determined to be baggage may increase if the threshold value is increased for preventing the erroneous determination.

Accordingly, in the vehicle, it is desirable to enhance the accuracy with respect to the determination of the type of in-vehicle object based on a detection result of the vehicle cabin obtained by using a millimeter radio wave.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 2:
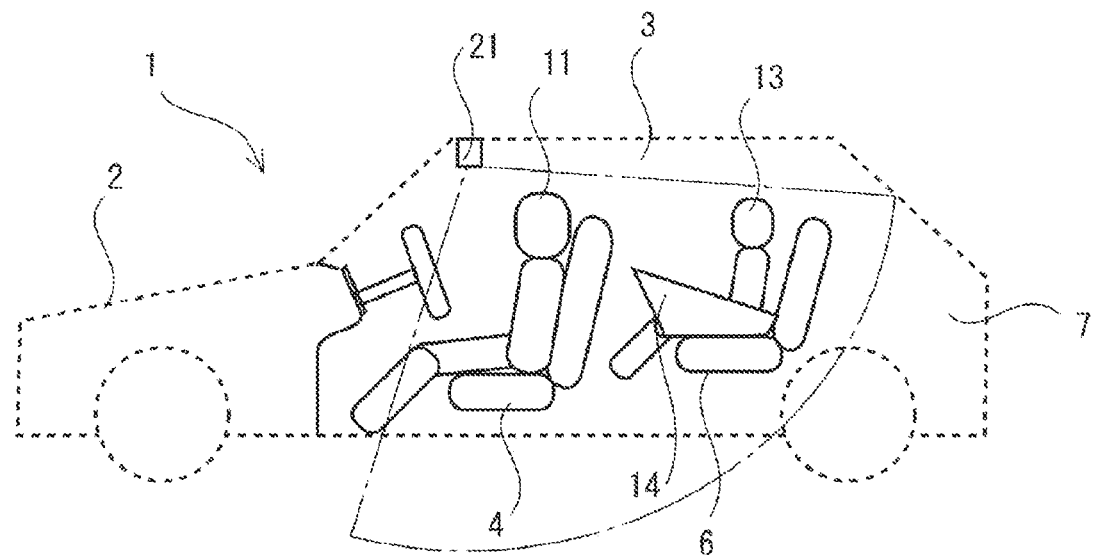
FIG. 2 is a vertical sectional view schematically illustrating the automobile in FIG. 1.

FIG. 1 is a plan view schematically illustrating an automobile 1 to which an unattended-occupant determination apparatus according to an embodiment of the disclosure is applied. FIG. 2 is a vertical sectional view schematically illustrating the automobile 1 in FIG. 1. The vertical sectional view in FIG. 2 illustrates the automobile 1 in FIG. 1 and is taken along a center position Y0 in the vehicle-width direction of the automobile 1.

The automobile 1 is an example of a vehicle. A power source of the automobile 1 may be any one of an internal combustion engine that burns either of gasoline and ethanol, an electric motor that uses stored electric power, a power source that uses hydrogen, and a combination of the above.

The automobile 1 illustrated in FIG. 1 and FIG. 2 has a vehicle body 2. The vehicle body 2 has a vehicle cabin (vehicle compartment) 3 that can accommodate a plurality of occupants. The vehicle cabin 3 is provided with a plurality of seats 4 to 6 disposed in the front-rear direction of the automobile 1. In the following order from the front, the plurality of seats 4 to 6 in the automobile 1 in FIG. 1 are front-row seats 4 and 5 in which a driver 11 and a passenger 12 can sit, and a rear-row seat 6 in which a plurality of occupants can sit side-by-side in the vehicle-width direction of the automobile 1. In this case, the front-row seats 4 and 5 serve as the front-most seats, and the rear-row seat 6 serves as the rear-most seat. A trunk 7 is provided behind the rear-row seat 6.

The driver 11 enters the vehicle cabin 3 by opening and closing a right-front door (not illustrated) and sits in the driver seat 4 in the front row, and exits from the vehicle cabin 3 by opening and closing the right-front door.

The passenger 12 enters the vehicle cabin 3 by, for example, opening and closing a left-front door (not illustrated) and sits in the passenger seat 5 in the front row, and exits from the vehicle cabin 3 by opening and closing the left-front door.

A child 13 enters the vehicle cabin 3 by, for example, opening and closing either one of a right-rear door (not illustrated) and a left-rear door (not illustrated) and sits in the rear-row seat 6, and exits from the vehicle cabin 3 by opening and closing either one of the right-rear door and the left-rear door. When assisting, for example, an infant, an adult, such as either one of the driver 11 and the passenger 12, opens and closes either one of the right-rear door and the left-rear door, fastens a child seat 14 to the rear-row seat 6, and sets the infant in the child seat 14. Alternatively, the child 13 may sit in the passenger seat 5 in the front row. The passenger 12 may sit in the rear-row seat 6.

The adults and the child 13 directly sitting in the seats 4 to 6 fasten seatbelts (not illustrated). Accordingly, the occupants sit in the seats 4 to 6 in a state where they rest their upper bodies on the backrests of the seats 4 to 6. The seated position of each occupant sitting in the corresponding one of the seats 4 to 6 is basically within a fixed range.

In the state where the occupants including the driver 11 and the passenger 12 on board are sitting in the seats 4 to 6 in the vehicle cabin 3, the automobile 1 travels in accordance with any one of a driving operation by the driver 11, a driving support mode, and an automated driving mode.

In such an automobile 1, for example, there have been studies with regard to monitoring the occupants 11 to 13 including the driver 11 in the vehicle cabin 3 while the automobile 1 is traveling, and executing control for providing an emergency notification and performing emergency stoppage if there is a state of emergency in any of the occupants.

Furthermore, in such an automobile 1, there have been studies with regard to outputting an alarm if either of the child 13 and baggage is left behind unattended in the vehicle cabin 3 after an adult, such as the driver 11, exits from the automobile 1.

Figure 3:
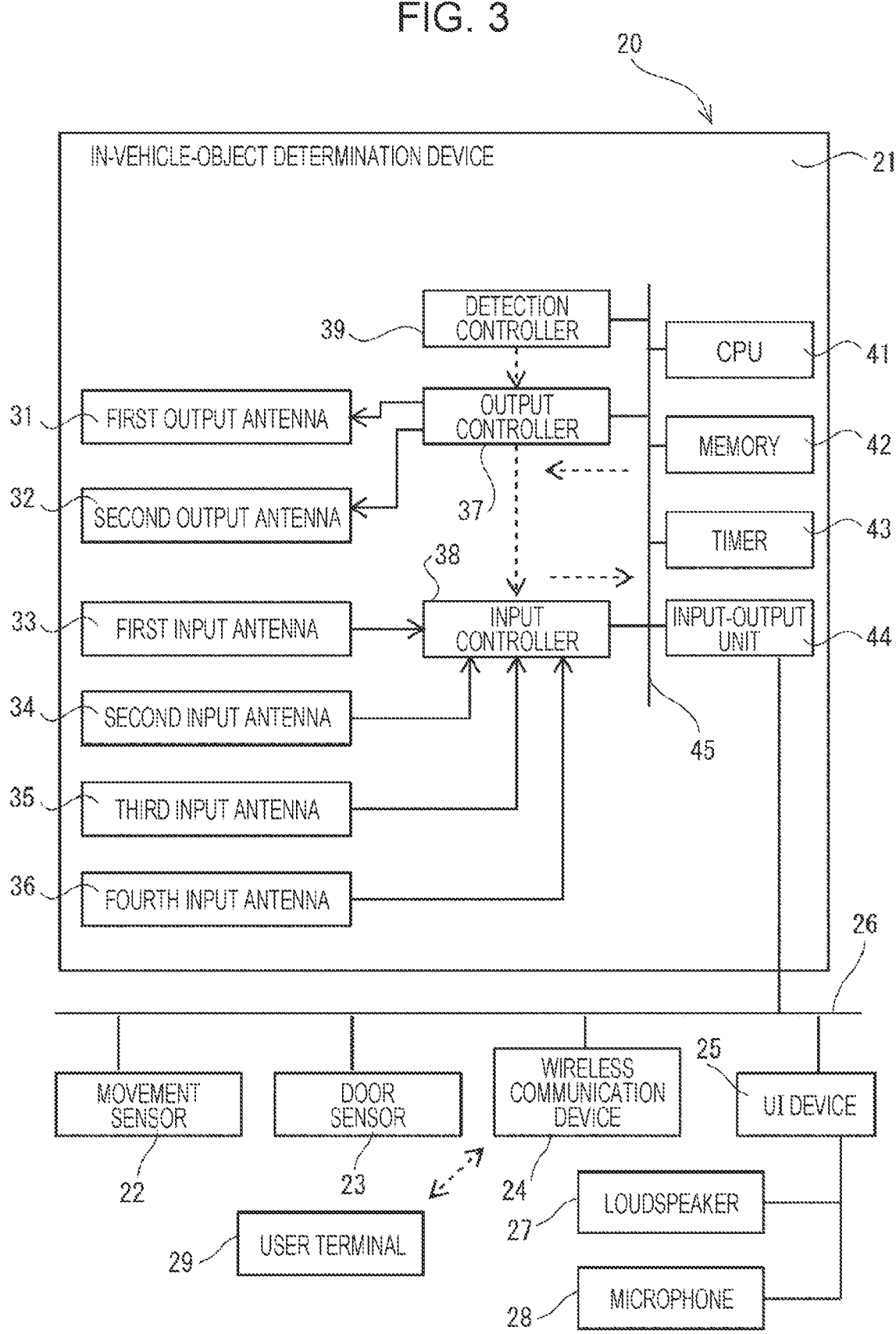
FIG. 3 illustrates a control system serving as the vehicle-interior monitoring apparatus in the automobile in FIG. 1.

FIG. 3 illustrates a control system 20 serving as a vehicle-interior monitoring apparatus in the automobile 1 in FIG. 1.

The control system 20 of the automobile 1 serves as a vehicle-interior monitoring apparatus that can detect and monitor in-vehicle objects, such as an occupant and baggage, in the vehicle cabin 3.

The control system 20 in FIG. 3 has an in-vehicle-object determination device 21, a movement sensor 22, a door sensor 23, a wireless communication device 24, a user interface (UI) device 25, and an in-vehicle network 26 to which these devices are coupled.

The in-vehicle network 26 may be a wired communication network compliant with, for example, a local interconnect network (LIN) or a controller area network (CAN) for the automobile 1. The in-vehicle network 26 may be a communication network, such as a local area network (LAN), or may be a combination of the above networks. The in-vehicle network 26 may partially include a wireless communication network.

The movement sensor 22 detects the movement of the automobile 1. The movement sensor 22 may be, for example, an acceleration sensor. Alternatively, the movement sensor 22 may be configured to predict and detect the movement of the automobile 1 by detecting, for example, an operation performed by the driver 11, an output from the power source, the braking state of a braking device, and the steering state of a steering device. The movement sensor 22 supplies detection data about the latest movement of the automobile 1 at the current time point to each unit of the automobile 1 via the in-vehicle network 26.

The door sensor 23 detects whether a plurality of doors (not illustrated) provided in the automobile 1 are opened or closed. The door sensor 23 may be provided for each of the openable-closable doors, such as the right-front door, the left-front door, the right-rear door, the left-rear door, and a hatchback door at the rear side of the vehicle body 2. When the door sensor 23 detects that any of the doors provided in the automobile 1 is opened or closed, the door sensor 23 supplies the detection data to each unit of the automobile 1 via the in-vehicle network 26. Accordingly, the door sensor 23 detects whether each door of the automobile 1 is opened or closed when an occupant exits from the automobile 1.

In addition to operating the door when exiting from the automobile 1, the occupant may operate the seatbelt and the ignition switch, and also hold and detach the key. The detection of the occupant exiting from the automobile 1 is possible by using, for example, a pressure sensor provided in the seat 4, an operation sensor of the steering wheel, and a vehicle-interior monitoring device equipped with a monitoring camera.

The wireless communication device 24 establishes a wireless communication path with a wireless-communication base station (not illustrated) provided outside the automobile 1, and exchanges data with the base station. Examples of the wireless-communication base station include a commercial-mobile-communication base station and a base station for exchanging traffic information. The base station is coupled to a server. The wireless communication device 24 may exchange data, via the base station or directly, with a user terminal 29 used by, for example, an occupant. In order to directly exchange data with the user terminal 29, the wireless communication device 24 may be configured to perform communication compliant with either of the IEEE 802.11 standard and the IEEE 802.15 standard. The control system 20 of the automobile 1 may be equipped with a plurality of wireless communication devices 24 for the respective communication standards. When the wireless communication device 24 acquires transmission data from each unit of the automobile 1 via the in-vehicle network 26, the wireless communication device 24 transmits the transmission data to the base station and the user terminal 29. When the wireless communication device 24 receives reception data from the base station and the user terminal 29, the wireless communication device 24 supplies the reception data to each unit of the automobile 1 via the in-vehicle network 26.

The user interface device 25 is coupled to, for example, a liquid crystal device, a touchscreen device, various switches, a loudspeaker 27, and a microphone 28 that are provided in the vehicle cabin 3 of the automobile 1. The liquid crystal device may be provided as, for example, a meter panel provided in a dashboard in the vehicle cabin 3 and located in front of the driver 11. The touchscreen device may be provided as, for example, a center display provided in the dashboard in the vehicle cabin 3 and located at the center in the vehicle-width direction. When the user interface device 25 acquires output data from each unit of the automobile 1 via the in-vehicle network 26, the user interface device 25 outputs the output data from the liquid crystal device serving as a meter panel, the touchscreen device serving as a center display, and the loudspeaker 27. Accordingly, each occupant can ascertain information about the automobile 1 through the user interface device 25. Furthermore, when either of the touchscreen device and a switch is operated or when a predetermined voice is input to the microphone 28, the user interface device 25 supplies the input data to each unit of the automobile 1 via the in-vehicle network 26.

The in-vehicle-object determination device 21 is configured to monitor each occupant and baggage in the vehicle cabin 3. The in-vehicle-object determination device 21 has a detection controller 39, an output controller 37, an input controller 38, an input-output unit 44, a timer 43, a memory 42, a central processing unit (CPU) 41, and an internal bus 45 to which the above units are coupled. The units in the in-vehicle-object determination device 21 are capable of receiving and outputting data from and to one another via the internal bus 45.

The output controller 37 is coupled to a first output antenna 31 and a second output antenna 32. The output controller 37 individually controls output of a detection radio wave with a millimeter-wave frequency from the first output antenna 31 and output of a detection radio wave with a millimeter-wave frequency from the second output antenna 32. The two-channel millimeter detection radio waves may be output at different output timings or may be output simultaneously. The millimeter detection radio waves may be temporally continuous or discontinuous radio waves. The millimeter detection radio waves may have different encoding data superimposed thereon between the first output antenna 31 and the second output antenna 32.

The input controller 38 is coupled to a first input antenna 33, a second input antenna 34, a third input antenna 35, and a fourth input antenna 36. With regard to the input controller 38, the first input antenna 33, the second input antenna 34, the third input antenna 35, and the fourth input antenna 36 each receive a reflection wave reflected by a baggage object with respect to a millimeter detection radio wave. The input controller 38 monitors and controls input of the reflection wave to the first input antenna 33, input of the reflection wave to the second input antenna 34, input of the reflection wave to the third input antenna 35, and input of the reflection wave to the fourth input antenna 36. The millimeter detection radio waves output with two channels may be received with four channels by the four antennas. Each input antenna receives the reflection wave at a timing according to the distance from the output antenna serving as the output source to the reflective baggage and the distance from the reflective baggage to the input antenna. The distance and the direction of the reflective baggage with reference to these antennas are uniquely identifiable three-dimensionally by basically causing at least three input antennas to receive reflection waves from the same reflective baggage. However, there is a possibility that one input antenna may simultaneously receive a plurality of reflection waves reflected by pieces of reflective baggage located in a plurality of directions. For example, by combining two-channel output and four-channel input, it is possible to calculate the distance to the reflective baggage for each direction by separating a reflection wave component in each direction from a combined wave having a mixture of a plurality of reflection waves. The spatial resolution to be used for detecting a plurality of occupants in the vehicle cabin 3 may be ensured in accordance with, for example, the encoding data to be superimposed on the detection radio waves and the timing control.

The detection controller 39 controls the output of two-channel millimeter detection radio waves by the output controller 37 and the input of four-channel reflection waves by the input controller 38. In addition to performing timing control between the output controller 37 and the input controller 38, the detection controller 39 may set the frequencies of millimeter detection radio waves to be output from the first output antenna 31 and the second output antenna 32 under the control of the output controller 37. A millimeter wave used is not limited to having a low frequency of about 24 GHz, and may have a high frequency of 60 to 78 GHz. The detection controller 39 may select one frequency from a plurality of frequencies, such as 24 GHz, 60 GHz, and 72 GHz, and set the selected frequency in the output controller 37. When the frequency is set, the output controller 37 executes control for outputting millimeter detection radio waves having the set frequency from the first output antenna 31 and the second output antenna 32.

Accordingly, the output controller 37, the first output antenna 31, the second output antenna 32, the input controller 38, the first input antenna 33, the second input antenna 34, the third input antenna 35, the fourth input antenna 36, and the detection controller 39 may each serve as a millimeter-wave sensor that outputs a millimeter radio wave toward the vehicle cabin 3 of the automobile 1 and detects a reflection wave from, for example, an occupant in the vehicle cabin 3 of the automobile 1.

The input-output unit 44 is coupled to the in-vehicle network 26. The input-output unit 44 exchanges data with each unit of the automobile 1 via the in-vehicle network 26.

The timer 43 measures a time period and a time point. For example, the timer 43 may measure cyclic timings for outputting detection radio waves and a time period elapsed from each output timing of a detection radio wave.

The memory 42 stores a program to be executed by the CPU 41, data to be used for executing the program, and data to be generated as a result of executing the program. The memory 42 may be constituted of a nonvolatile memory, such as a RAM, and a nonvolatile memory, such as either one of a solid state drive (SSD) and a hard disk drive (HDD).

The CPU 41 reads the program from the memory 42 and executes the program. Accordingly, in the in-vehicle-object determination device 21, a controller that controls the overall operation thereof is realized. The CPU 41 may be, for example, any one of an electronic control unit (ECU), a microcomputer, and an application-specific integrated circuit (ASIC), so long as the CPU 41 has a computing function for executing the program.

For example, the CPU 41 serving as a controller may perform a monitoring process by determining the presence or absence and the type of in-vehicle object, such as either of an occupant and baggage, in the vehicle cabin 3 based on the detection level of a reflection wave of a millimeter detection radio wave.

In this case, the CPU 41 serving as a controller may select the frequency of the millimeter detection radio wave from a plurality of frequencies set in advance, and command the detection controller 39 to set the selected frequency. The radio-wave frequency that the CPU 41 can command the detection controller 39 to set may include a plurality of frequencies including a first frequency, such as 60 GHz, and a second frequency, such as 24 GHz, lower than the first frequency. In this case, the detection controller 39 executes a setting process in response to the command given by the CPU 41 and changes the frequency of the millimeter detection radio wave.

The CPU 41 serving as a controller may additionally serve as, for example, a determiner that detects an in-vehicle object, such as either of an occupant and baggage, in the vehicle cabin 3 of the automobile 1 and monitors the detected in-vehicle object. In this case, the CPU 41 may determine the type of in-vehicle object in the vehicle cabin 3 of the automobile 1 in accordance with a comparison between a threshold value and the detection level of a millimeter reflection wave detected by the input controller 38.

For example, when an adult occupant, such as the driver 11, exits from the automobile 1, the CPU 41 serving as a controller may determine whether either of the child 13 and baggage is left behind unattended in the vehicle cabin 3. Then, if either of the child 13 and baggage is left behind unattended in the vehicle cabin 3 of the automobile 1, the CPU 41 may output an alarm to the occupant from, for example, the liquid display device serving as a meter panel, the touchscreen device serving as a center display, and the loudspeaker 27 via the user interface device 25. The CPU 41 may also output an alarm to the user terminal 29, used by the occupant, via the wireless communication device 24.

As illustrated in FIG. 1, the in-vehicle-object determination device 21 having the millimeter-wave sensors 31 to 39 are provided at the center position Y0 in the vehicle-width direction of the automobile 1 and are disposed at the front edge of the ceiling in the vehicle cabin 3 of the automobile 1. The in-vehicle-object determination device 21 having the millimeter-wave sensors 31 to 39 are provided at the position of the so-called overhead console. The in-vehicle-object determination device 21 outputs a millimeter detection radio wave mainly rearward and downward toward the entire vehicle cabin 3 from the installed location of the in-vehicle-object determination device 21. Accordingly, the in-vehicle-object determination device 21 having the millimeter-wave sensors 31 to 39 is provided facing rearward and downward from an upper-front position located forward of the seatbacks of all the seats 4 to 6 provided in the vehicle cabin 3. Consequently, a millimeter detection radio wave can be output toward the front surface of the chest of each of the occupants sitting in the seats 4 to 6. The central direction in which the in-vehicle-object determination device 21 mainly outputs a radio wave may at least be the rearward direction.

Furthermore, in the in-vehicle-object determination device 21 provided at the position of the overhead console, the first output antenna 31 and the second output antenna 32 may be separated from each other by a predetermined distance and be provided parallel to, for example, either of the vehicle-width direction and the front-rear direction. For example, the first input antenna 33, the second input antenna 34, the third input antenna 35, and the fourth input antenna 36 may be disposed at the four corners of a rectangle whose four sides extend in the vehicle-width direction and the front-rear direction.

Figure 4:
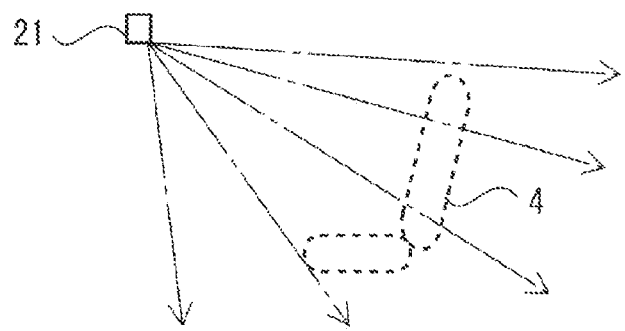
FIG. 4 is a diagram of a first detection state for explaining the detection principle of millimeter-wave sensors used in an in-vehicle-object determination device in FIG. 3.

FIG. 4 is a diagram of a first detection state for explaining the detection principle of the millimeter-wave sensors 31 to 39 used in the in-vehicle-object determination device 21 in FIG. 3. In the first detection state, there is no occupant or baggage in the seat 4.

FIG. 4 illustrates one seat 4 and the in-vehicle-object determination device 21 provided at the front-upper side of the seat 4. The in-vehicle-object determination device 21 outputs a millimeter detection radio wave having the set frequency from an output antenna, such as either one of the first output antenna 31 and the second output antenna 32.

In FIG. 4, there is no in-vehicle object, such as either of an occupant and baggage, in the seat 4. Therefore, the millimeter detection radio wave to be output rearward and downward from the in-vehicle-object determination device 21 toward the seat 4 passes through the seat 4. The seat 4 basically has springs set in the seat frame and is entirely covered with urethane and cloth. The seat 4 with such a structure and material hardly reflects a millimeter detection radio wave. As a result, the in-vehicle-object determination device 21 does not receive a reflection wave from the seat 4.

Figure 5:
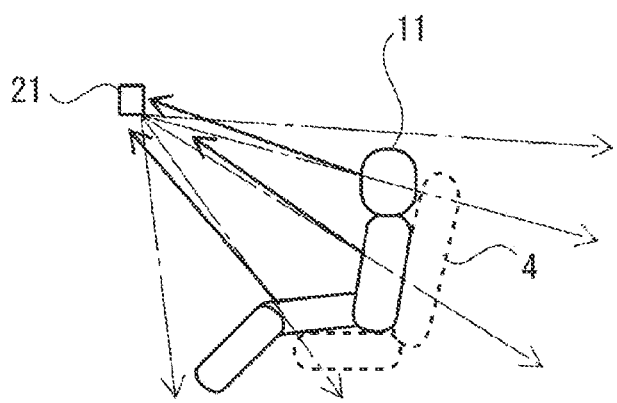
FIG. 5 is a diagram of a second detection state in which an occupant is sitting in a seat in FIG. 4.

FIG. 5 is a diagram of a second detection state in which an occupant is sitting in the seat 4 in FIG. 4. FIG. 5 illustrates one seat 4, the in-vehicle-object determination device 21 provided at the front-upper side of the seat 4, and the occupant sitting in the seat 4.

In this case, since the occupant is sitting in the seat 4, a millimeter detection radio wave output from an output antenna, such as either one of the first output antenna 31 and the second output antenna 32, may be reflected at the surface of the occupant. A millimeter reflection wave from the occupant returns toward the in-vehicle-object determination device 21. The plurality of input antennas 33 to 36 of the in-vehicle-object determination device 21 receive the millimeter reflection wave. The in-vehicle-object determination device 21 can detect a reflection wave stronger than that in FIG. 4.

Figure 6:
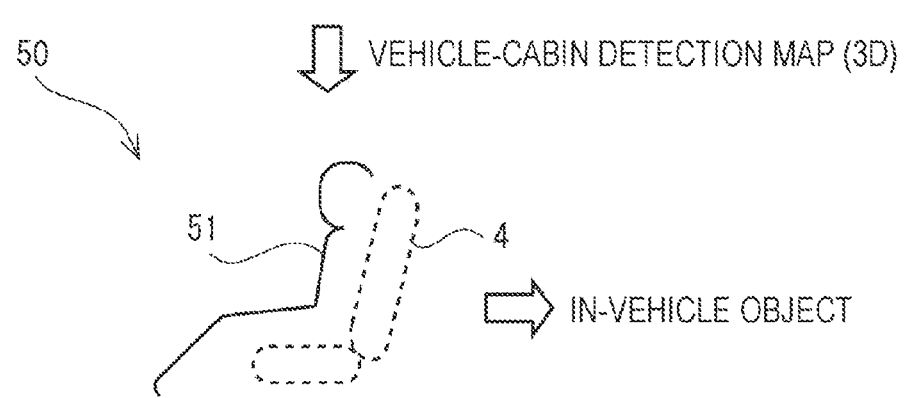
FIG. 6 illustrates a three-dimensional vehicle-cabin detection map that can be generated based on detection by the millimeter-wave sensors in the second detection state in FIG. 5.

FIG. 6 illustrates a three-dimensional vehicle-cabin detection map 50 that can be generated based on the detection by the millimeter-wave sensors 31 to 39 in the second detection state in FIG. 5.

FIG. 6 illustrates the seat 4 and a reflective surface 51 detected with respect to the occupant sitting in the seat 4. The CPU 41 of the in-vehicle-object determination device 21 uses two-channel output and four-channel input in combination with each other to separate a reflection wave component in each direction from an input wave having a mixture of a plurality of reflection waves, thereby calculating the distance to reflective baggage for each direction. In this case, the CPU 41 of the in-vehicle-object determination device 21 may vary the output timings of millimeter-wave detection signals from the plurality of output antennas or may vary the detection periods and timings of the millimeter waves from the plurality of input antennas 33 to 36. As a result, the CPU 41 of the in-vehicle-object determination device 21 obtains the distance for each input direction of a reflection wave with reference to the installed location of the in-vehicle-object determination device 21, thereby generating a vehicle-cabin detection map 50 indicating the shape and size of the three-dimensional reflective surface 51, as indicated with a solid line in FIG. 6, extending along the surface of the occupant.

If respiratory movement on the chest surface of the occupant sitting stably in the seat 4 is to be detected based on a millimeter reflection wave, the vehicle-cabin detection map 50 is to temporally contain a movement component of the reflective surface. In this case, instead of having a low frequency of, for example, about 24 GHz, the millimeter wave used may belong to a high frequency range, such as a frequency of 50 GHz or higher, preferably, 60 to 78 GHz. By using a high-frequency millimeter wave as a detection radio wave, a temporally-fluctuating component of the chest surface caused by respiration may be observed in the vehicle-cabin detection map 50. By using a high-frequency millimeter detection radio wave, high spatial resolution that enables detection of the respiratory movement on the chest surface of the occupant present in the vehicle cabin 3 of the automobile 1 can be obtained in the vehicle-cabin detection map 50.

On the other hand, if a vehicle-cabin detection map 50 covering a wide detection range throughout the entire vehicle cabin 3 of the automobile 1 is to be obtained, a millimeter wave with a low frequency of 24 GHz or lower may be used. A millimeter detection radio wave with a low frequency, such as 24 GHz, does not enable highly-accurate detection of the chest-surface movement of the occupant or the size and shape of an in-vehicle object, as in the case where a high frequency is used, but tends to travel around the baggage to reach behind the baggage and is thus immune against being blocked. When a millimeter detection radio wave with a high frequency of 60 GHz or higher is used, for example, it is not easy for the millimeter detection radio wave to effectively reach the rear side of a seat-back containing a metal sheet or the left and right edges of the vehicle cabin 3 in the vehicle-width direction. If an in-vehicle object is present in an area that the millimeter detection radio wave is not effectively reachable, it is difficult to obtain a significant reflection wave from the in-vehicle object. The seat-back of the rearmost seat, such as the rear-row seat 6 in FIG. 1, located in front of the trunk 7 has a metal sheet over the entire width in the vehicle-width direction of the automobile 1.

Therefore, in this embodiment, the frequency of the millimeter wave to be used as a detection radio wave is used in a switching manner between at least two frequencies, that is, a high frequency and a low frequency. This description relates to a case where 60 GHz and 24 GHz are used.

In this embodiment, in order to use the frequency of the millimeter wave in a switching manner, the entire vehicle cabin 3 can be thoroughly detected with high resolution by simply providing a single in-vehicle-object determination device 21 in the vehicle cabin 3 of the automobile 1. Thus, the vehicle cabin 3 of the automobile 1 is not to be provided with a plurality of in-vehicle-object determination devices 21 in correspondence with the plurality of seats 4 to 6. The number of in-vehicle-object determination devices 21 is reduced to a minimum, so that an increase in cost involved in using a millimeter wave for monitoring, for example, occupants can be suppressed. In addition, since the number of in-vehicle-object determination devices 21 is reduced, excessive limitations with regard to the disposition of various devices including the in-vehicle-object determination device 21 in the vehicle cabin 3 do not occur.

Figure 7:
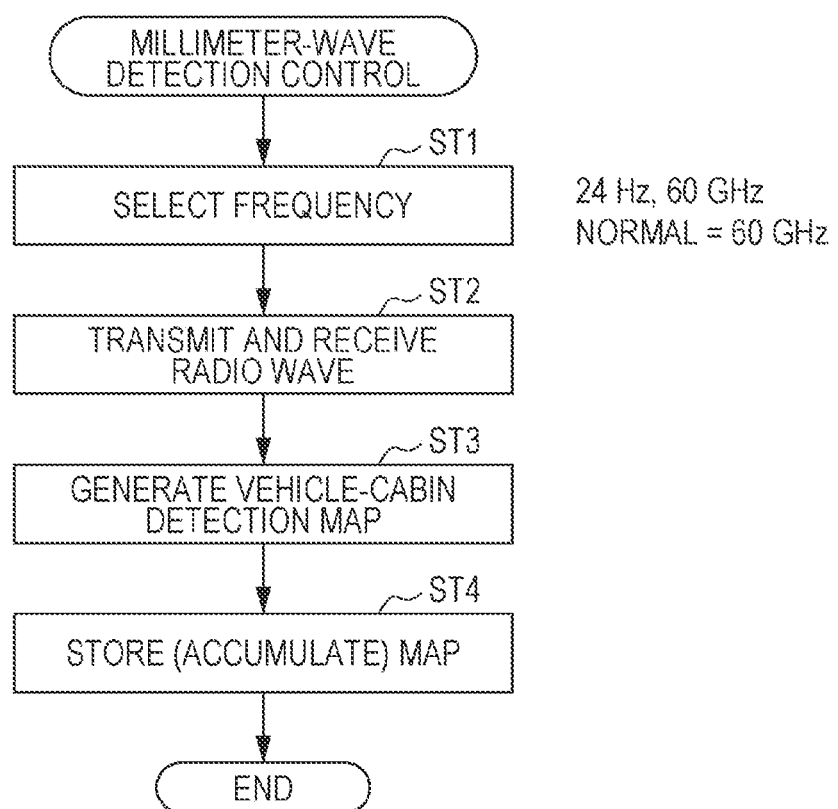
FIG. 7 is a flowchart of a millimeter-wave detection control process executed by a central processing unit (CPU) of the in-vehicle-object determination device in FIG. 3.

FIG. 7 is a flowchart of a millimeter-wave detection control process executed by the CPU 41 of the in-vehicle-object determination device 21 in FIG. 3.

The CPU 41 of the in-vehicle-object determination device 21 repeatedly executes the process in FIG. 7.

The CPU 41 may repeatedly execute the process in FIG. 7 for every detection period measured by the timer 43.

In step ST1, the CPU 41 selects the frequency of a millimeter detection radio wave to be used for detecting an in-vehicle object, such as either of an occupant and baggage, present in the vehicle cabin 3 from a plurality of frequency candidates, such as 60 GHz and 24 GHz.

During a normal mode, such as when the automobile 1 is traveling, the CPU 41 may select the high frequency of 60 GHz to enable detection of the respiratory movement on the chest surface of the occupant present in the vehicle cabin 3.

If in-vehicle objects, such as the child 13 and baggage, left behind unattended are to be detected, the CPU 41 may select the low frequency of 24 GHz to enable detection throughout the vehicle cabin 3.

In step ST2, the CPU 41 causes each of the first output antenna 31 and the second output antenna 32 to output a millimeter detection radio wave having the selected frequency, and detects input of a millimeter reflection wave. The CPU 41 commands the output controller 37 to output a millimeter detection radio wave. The output controller 37 outputs the millimeter detection radio wave having the selected frequency from each of the first output antenna 31 and the second output antenna 32. In this case, the output controller 37 may scan the vehicle cabin 3 by, for example, adjusting the interval between the output timing of the millimeter detection radio wave from the first output antenna 31 and the output timing of the millimeter detection radio wave from the second output antenna 32.

If there are occupants sitting in the seats 4 to 6 in the vehicle cabin 3 or if there is baggage in the seats 4 to 6 or the trunk 7, the millimeter detection radio wave is reflected by the occupants or the baggage. The reflection waves from the in-vehicle objects are input to the first input antenna 33, the second input antenna 34, the third input antenna 35, and the fourth input antenna 36 of the in-vehicle-object determination device 21. The input controller 38 generates information about the reflection wave input to the first input antenna 33, information about the reflection wave input to the second input antenna 34, information about the reflection wave input to the third input antenna 35, and information about the reflection wave input to the fourth input antenna 36, and outputs these pieces of information to the CPU 41.

In step ST3, the CPU 41 generates a vehicle-cabin detection map 50 indicating the positions and ranges in the vehicle cabin 3 with respect to reflective surfaces of the in-vehicle objects, such as the occupants and the baggage, present in the vehicle cabin 3 based on the detection information about the reflection waves from the input controller 38. With regard to the vehicle-cabin detection map 50, the range of the vehicle cabin 3 indicated with a single-dot chain line in FIG. 1 may basically be the detection range using the reflection waves of the millimeter waves. The CPU 41 serves as a controller to generate the vehicle-cabin detection map 50 obtained as a result of the vehicle cabin 3 of the automobile 1 being detected based on the reflection waves reflected in the respective areas in the vehicle cabin 3 of the automobile 1 and detected by the millimeter-wave sensors 31 to 39.

In step ST4, the CPU 41 stores the generated vehicle-cabin detection map 50 in the memory 42 together with information about a detection time point measured by the timer 43. Accordingly, a plurality of vehicle-cabin detection maps 50 generated at different timings are stored in the memory 42 in correspondence with information about respective detection time points. The plurality of vehicle-cabin detection maps 50 contain information about temporal changes in the movement of the occupants and baggage in the vehicle cabin 3.

Figure 8:
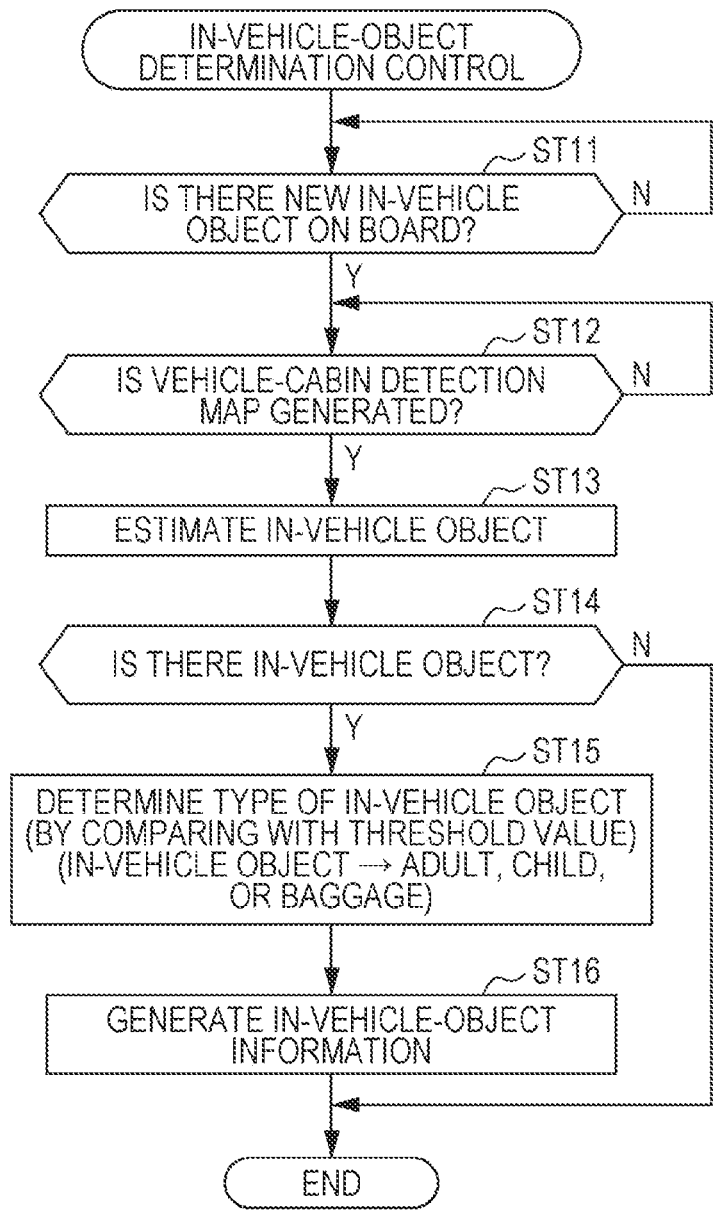
FIG. 8 is a flowchart of a basic in-vehicle-object determination control process executed by the CPU of the in-vehicle-object determination device in FIG. 3.

FIG. 8 is a flowchart of a basic in-vehicle-object determination control process executed by the CPU 41 of the in-vehicle-object determination device 21 in FIG. 3.

For example, the CPU 41 of the in-vehicle-object determination device 21 repeatedly executes the process in FIG. 8 every time the millimeter-wave detection control process in FIG. 7 is executed.

The CPU 41 may repeatedly execute the process in FIG. 8 for every detection period measured by the timer 43.

In step ST11, the CPU 41 determines whether there is a new occupant or baggage on board the automobile 1. For example, the CPU 41 may determine whether there is a new occupant or baggage on board the automobile 1 based on whether the door sensor 23 has detected that a door is newly opened or closed. If there is no new occupant or baggage on board, the CPU 41 determines that there is no new in-vehicle object on board, and repeats the process. If there is a new occupant or new baggage on board, the CPU 41 determines that there is a new in-vehicle object on board, and proceeds to step ST12.

In step ST12, the CPU 41 determines whether a new vehicle-cabin detection map 50 has been generated. For example, the CPU 41 may perform the determination based on whether a newly-generated vehicle-cabin detection map 50 is stored in the memory 42. If a new vehicle-cabin detection map 50 is not generated, the CPU 41 repeats the process. If a new vehicle-cabin detection map 50 is generated, the CPU 41 proceeds to step ST13.

In step ST13, the CPU 41 estimates the in-vehicle object based on the new vehicle-cabin detection map 50. The vehicle-cabin detection map 50 contains a component of the reflective surface of the occupant or baggage that has reflected the millimeter detection radio wave. The CPU 41 may estimate the in-vehicle object based on a differential component between the new vehicle-cabin detection map 50 and the vehicle-cabin detection map 50 corresponding to a case where, for example, there is no occupant or baggage whatsoever. The CPU 41 may estimate the size of the in-vehicle object from a range that includes the differential component in the vehicle-cabin detection map 50. The CPU 41 may estimate the position of any of the seats 4 to 6 where the in-vehicle object that has caused the differential component to occur is present based on the position with respect to the range including the differential component with reference to the position of the in-vehicle-object determination device 21. The CPU 41 may estimate the size and the position with respect to each of a plurality of in-vehicle objects present in the vehicle cabin 3.

In step ST14, the CPU 41 determines whether the in-vehicle object has been detected. If even a single in-vehicle object is estimated in step ST13, the CPU 41 determines that there is an in-vehicle object and proceeds to step ST15. If not even a single in-vehicle object is estimated, the CPU 41 determines that there is no in-vehicle object and ends the control process.

Accordingly, the CPU 41 serves as a determiner that can perform determination based on the detection of a reflection wave by each of the millimeter-wave sensors 31 to 39, and determine the presence or absence and the type of occupant present in the vehicle cabin 3 of the automobile 1 based on the vehicle-cabin detection map 50 of the automobile 1.

In step ST15, the CPU 41 determines the type of in-vehicle object, that is, determines whether the in-vehicle object is either of a person (i.e., an occupant) and baggage.

In this determination between a person and baggage, for example, the CPU 41 may use detection levels in predetermined directions estimated as in-vehicle-object ranges in a plurality of vehicle-cabin detection maps 50 from a past vehicle-cabin detection map 50 to a new vehicle-cabin detection map 50.

The body of an adult sitting in any of the seats 4 to 6 is closer to the millimeter-wave sensors 31 to 39, as compared with the body of a child sitting in any of the seats 4 to 6 or baggage placed on any of the seats 4 to 6. Therefore, the detection level of a millimeter reflection wave from an adult is higher than those of a child and baggage.

Furthermore, the body of a child sitting in any of the seats 4 to 6 is basically closer to the millimeter-wave sensors 31 to 39, as compared with baggage placed on any of the seats 4 to 6. Therefore, the detection level of a millimeter reflection wave from a child is higher than that of baggage.

Thus, for example, the CPU 41 compares the acquired detection level with a high threshold value that is lower than the adult detection level and higher than the child detection level. If the acquired detection level is higher than or equal to the high threshold value, the CPU 41 may determine that the in-vehicle object is an adult.

Moreover, for example, the CPU 41 compares the acquired detection level with a low threshold value that is lower than the child detection level and higher than the baggage detection level. If the acquired detection level is higher than or equal to the low threshold value, the CPU 41 may determine that the in-vehicle object is a child.

If the acquired detection level is lower than the low threshold value, the CPU 41 may determine that the in-vehicle object is baggage.

In step ST16, the CPU 41 generates information about the determined in-vehicle object and stores the information in the memory 42. In the memory 42, in-vehicle-object information about either of the occupant and baggage, determined based on at least the latest detection, on board the automobile 1 is stored for each in-vehicle object.

Figure 9:
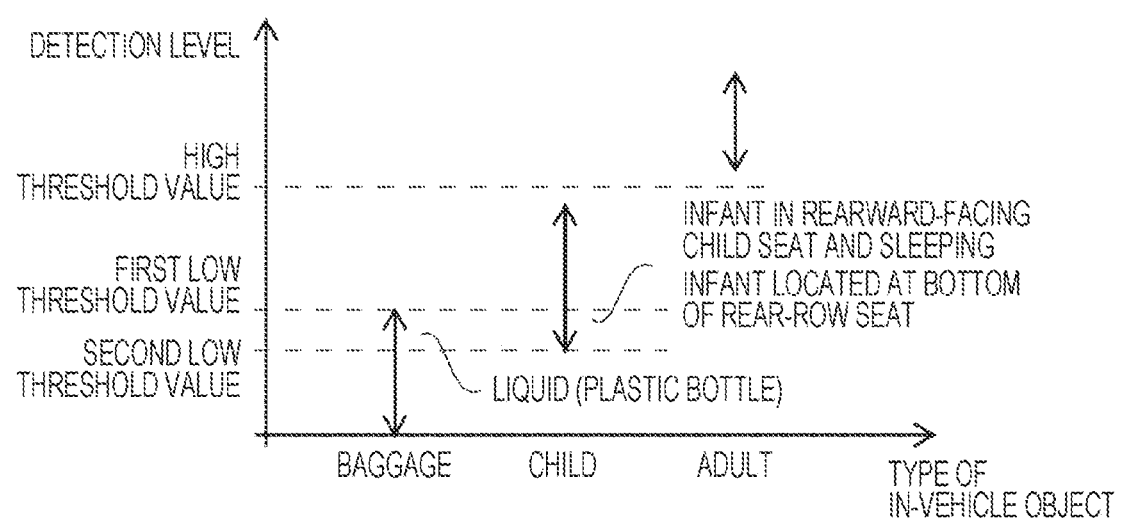
FIG. 9 illustrates a millimeter-wave detection-level distribution with respect to an occupant and baggage within a vehicle cabin.

FIG. 9 illustrates a millimeter-wave detection-level distribution with respect to an occupant and baggage within the vehicle cabin 3.

In FIG. 9, the ordinate axis denotes the millimeter-wave detection level of each in-vehicle object, whereas the abscissa axis denotes three types of in-vehicle objects, namely, baggage, a child, and an adult.

As illustrated in FIG. 9, the in-vehicle objects, such as baggage, a child, and an adult, within the vehicle cabin 3 each have a millimeter-wave detection-level distribution range.

For example, an adult in the vehicle cabin 3 reflects a millimeter wave at each body part, as illustrated in FIG. 6. For example, the millimeter-wave detection level illustrated in FIG. 9 may have a maximum value for the reflection wave at each body part in FIG. 6. It is conceivable that a millimeter-wave detection-level distribution range having the same tendency as in FIG. 9 can be obtained by using an average value or median value of the reflection wave at each part of an in-vehicle object.

An adult in the vehicle cabin 3 corresponds to a high detection level even when the adult is sitting in any of the seats 4 to 6.

A child in the vehicle cabin 3 corresponds to a low detection level, as compared with an adult in the vehicle cabin 3, even when the child is sitting in any of the seats 4 to 6. The detection level of a millimeter reflection wave from an infant sleeping in a child seat disposed facing rearward in the rear-row seat 6 and the detection level of a millimeter reflection wave from an infant located at the bottom of the rear-row seat 6 tend to be the lowest in the child's distribution range.

Baggage in the vehicle cabin 3 basically corresponds to a low detection level even when the baggage is placed on either of the seats 5 and 6. The detection level of a millimeter reflection wave from transparent-liquid-containing baggage, such as a plastic bottle containing a liquid, tends to be the highest in the baggage's distribution range.

As a result, the detection level of a millimeter reflection wave from baggage, such as a plastic bottle containing a liquid, in FIG. 9 may possibly be higher than the detection level of a millimeter reflection wave from a child, such as an infant.

If the detection-level distribution ranges of a plurality of types of in-vehicle objects overlap in this manner, it may possibly be difficult to accurately determine the type of in-vehicle object by simply comparing such a millimeter-wave detection level with a threshold value. It is not easy to enhance the accuracy with respect to the determination of the type of in-vehicle object.

Accordingly, a reflection-wave detection level is not necessarily clearly divided for each type of in-vehicle object. Thus, it may possibly be difficult to accurately determine the type of the detected in-vehicle object even by comparing the detection level with a plurality of threshold values.

In particular, the difference between the detection level of a millimeter reflection wave from a child including an infant and the detection level of a millimeter reflection wave from baggage basically tends to be small. Because the detection level of a millimeter reflection wave from an occupant, such as an adult, is basically higher than the detection level of a millimeter reflection wave from baggage, a clear distinction is possible. However, the detection level of a millimeter reflection wave from a child, such as an infant, may sometimes be lower than the detection level of a millimeter reflection wave from baggage. For example, the detection level of a millimeter reflection wave from transparent-liquid-containing baggage, such as a plastic bottle containing a liquid, may sometimes be higher than the detection level of a millimeter reflection wave from a child, such as an infant. In this case, depending on the set threshold value, the plastic bottle containing the liquid may erroneously be determined to be a child, or the possibility of the child being erroneously determined to be baggage may increase if the threshold value is increased for preventing the erroneous determination.

If the type of in-vehicle object is to be determined based on the detection result of the vehicle cabin 3 obtained by using a millimeter radio wave in this manner, it is demanded that the accuracy thereof be enhanced.

Figure 10:
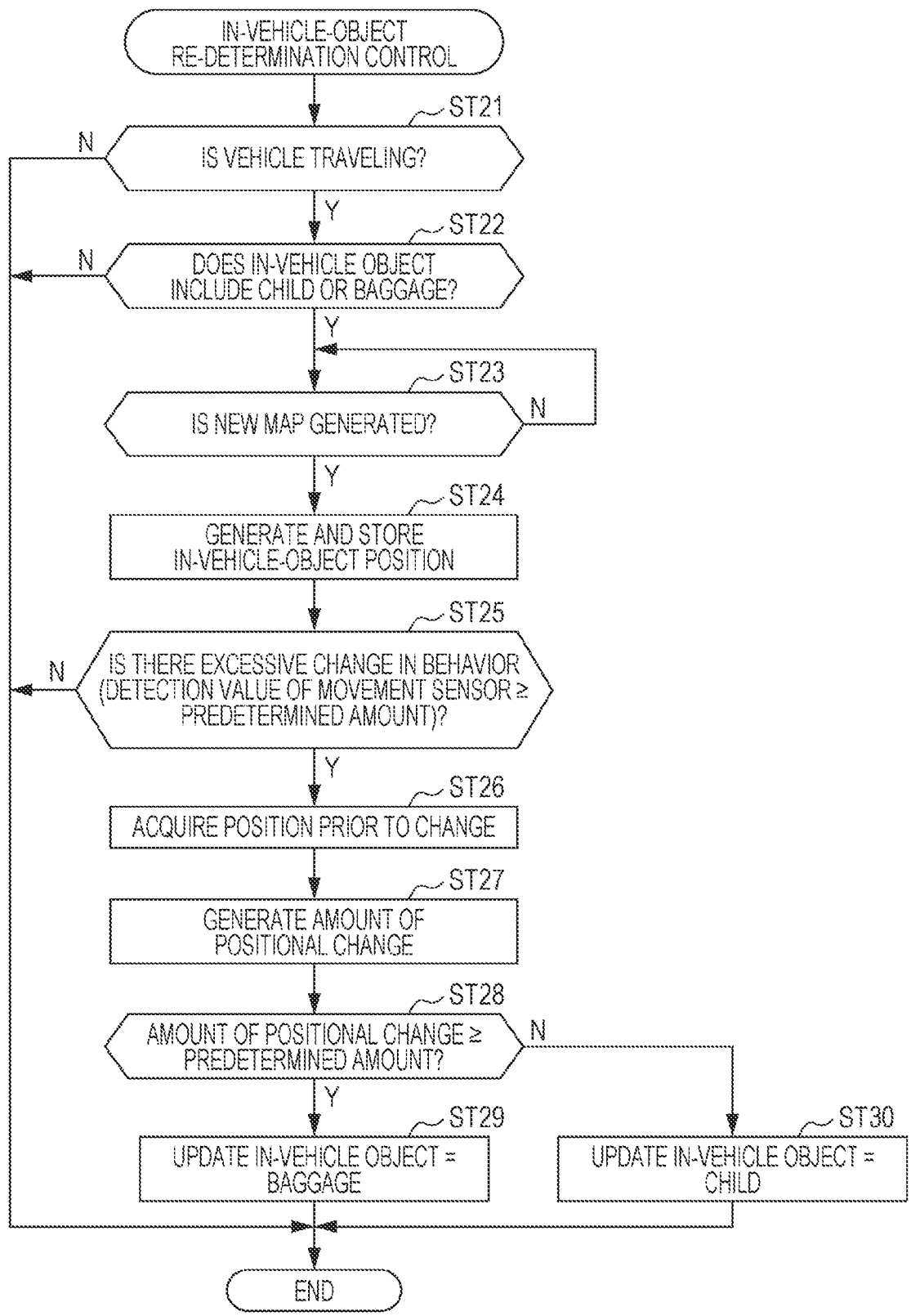
FIG. 10 is a flowchart of an in-vehicle-object-type re-determination control process executed by the CPU of the in-vehicle-object determination device in FIG. 3.

FIG. 10 is a flowchart of an in-vehicle-object-type re-determination control process executed by the CPU 41 of the in-vehicle-object determination device 21 in FIG. 3.

For example, after the process in FIG. 8, the CPU 41 of the in-vehicle-object determination device 21 may repeatedly execute the process in FIG. 10 as a process different from that in FIG. 8 every time the millimeter-wave detection control process in FIG. 7 is executed.

For example, after the process in FIG. 8, the CPU 41 may repeatedly execute the process in FIG. 10 for every detection period measured by the timer 43.

In step ST21, the CPU 41 determines whether the automobile 1 is traveling. The CPU 41 may determine whether the automobile 1 is traveling based on, for example, whether the movement sensor 22 of the automobile 1 is detecting the acceleration or speed thereof while the automobile 1 is traveling. If the automobile 1 is traveling, the CPU 41 proceeds to step ST22. If the automobile 1 is not traveling, the CPU 41 ends the control process.

In step ST22, the CPU 41 determines whether a detected in-vehicle object includes either of a child and baggage. For example, the CPU 41 may acquire in-vehicle-object information stored in the memory 42 as a result of the control process in FIG. 8 and determine whether the acquired in-vehicle-object information contains an attribute of either of a child and baggage. If the in-vehicle-object information contains an attribute of either of a child and baggage, the CPU 41 determines that the detected in-vehicle object includes either of a child and baggage, and proceeds to step ST23. If the in-vehicle-object information does not contain an attribute of either of a child and baggage, the CPU 41 determines that the detected in-vehicle object does not include either of a child and baggage, and ends the control process.

In step ST23, the CPU 41 determines whether a new vehicle-cabin detection map 50 is generated. If a new vehicle-cabin detection map 50 is not generated after the previous process in FIG. 10, the CPU 41 repeats the current process. When a new vehicle-cabin detection map 50 is generated, the CPU 41 proceeds to step ST24.

In step ST24, the CPU 41 generates positional information of each detected in-vehicle object based on the new vehicle-cabin detection map 50. The CPU 41 may estimate each in-vehicle object with respect to the vehicle-cabin detection map 50 and estimate the size and position of the in-vehicle object. The CPU 41 stores the generated positional information of each in-vehicle object in the memory 42. Accordingly, the memory 42 accumulatively stores a plurality of pieces of positional information about the in-vehicle objects in a time-series fashion.

In step ST25, the CPU 41 determines the behavior of the automobile 1. When the automobile 1 is traveling, the behavior thereof changes in accordance with steering and acceleration even during, for example, a normal traveling mode. The movement sensor 22 detects the behavior of the traveling automobile 1. For example, the CPU 41 may determine that the automobile 1 is excessively steered or accelerated based on whether a detection value of the movement sensor 22 is larger than or equal to a predetermined value. If the automobile 1 is excessively steered or accelerated, the CPU 41 proceeds to step ST26. If the automobile 1 is not excessively steered or accelerated, the CPU 41 ends the control process.

In step ST26, the CPU 41 acquires positional information of each in-vehicle object prior to the occurrence of the excessive behavior of the automobile 1, that is, prior to the change. The CPU 41 acquires, from the memory 42, past positional information of each in-vehicle object prior to the occurrence of the excessive behavior of the automobile 1. For example, the CPU 41 may acquire positional information stored prior to the latest positional information stored in the memory 42.

In step ST27, the CPU 41 generates an amount of positional change of each detected in-vehicle object. The CPU 41 may calculate the amount of positional change after the behavior has occurred in step ST24 with reference to the position acquired in step ST26.

In step ST28, the CPU 41 determines whether the generated amount of positional change of each in-vehicle object is larger than or equal to a predetermined amount. For example, the predetermined amount may be a value to an extent that baggage moves due to the behavior of the automobile 1. If the amount of positional change of the in-vehicle object is larger than or equal to the predetermined amount, the CPU 41 determines that the in-vehicle object is baggage, and proceeds to step ST29. If the amount of positional change of the in-vehicle object is smaller than the predetermined amount, the CPU 41 determines that the in-vehicle object is a child, and proceeds to step ST30.

Accordingly, the CPU 41 serves as a determiner that can re-determine whether the in-vehicle object, having undergone the determination based on the detection level of a millimeter reflection wave, is either of a child and baggage based on the magnitude of a positional change of the in-vehicle object when the behavior of the automobile 1 greatly changes due to the movement of the automobile 1 detected by the movement sensor 22. With reference to the position of the in-vehicle object prior to a change in the behavior of the automobile 1 due to the movement of the automobile 1 detected by the movement sensor 22, the CPU 41 can re-determine that the in-vehicle object is baggage if the positional change of the in-vehicle object is larger than or equal to the predetermined amount, and re-determine that the in-vehicle object is a child if the positional change of the in-vehicle object is smaller than the predetermined amount.

In step ST29, the CPU 41 updates the in-vehicle-object information stored in the memory 42 to baggage.

In step ST30, the CPU 41 updates the in-vehicle-object information stored in the memory 42 to a child.

The following description relates to positional changes in a child sitting in the rear-row seat 6 and baggage placed thereon.

Figure 11:
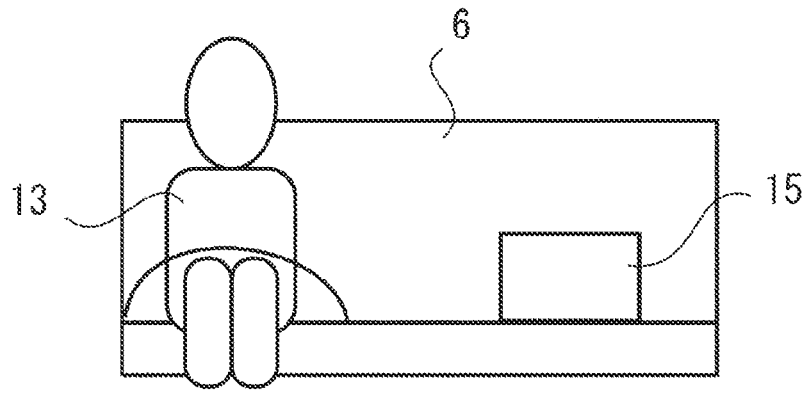
FIG. 11 illustrates positional changes in a child sitting in a rear-row seat and baggage placed thereon before excessive behavior occurs in the automobile.

FIG. 11 illustrates positional changes in a child sitting in the rear-row seat 6 and baggage placed thereon before excessive behavior occurs in the automobile 1. The seated position of the child is fixed by a seatbelt. The baggage is placed on the seat face of the seat 6. Positional information containing the seated position of the child and positional information containing the placement position of the baggage in the state in FIG. 11 are stored in the memory 42.

Figure 12:
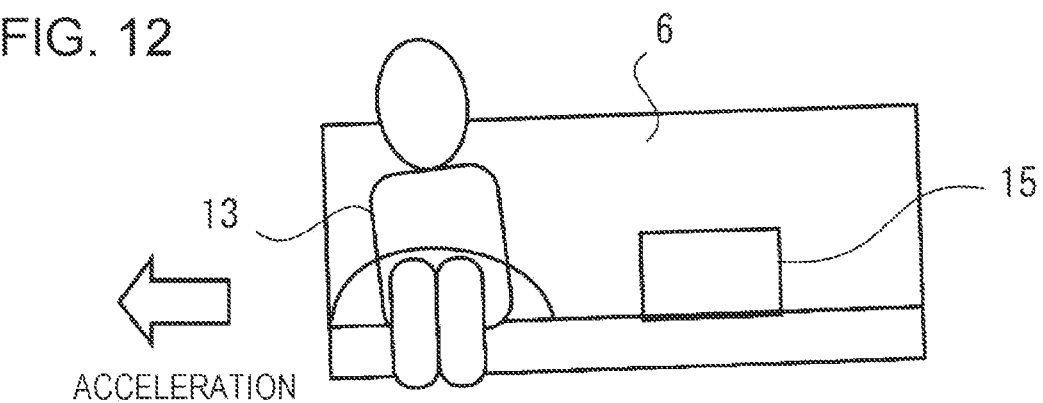
FIG. 12 illustrates positional changes in the child sitting in the rear-row seat and the baggage placed thereon in a state where excessive behavior is occurring in the automobile.

FIG. 12 illustrates positional changes in the child sitting in the rear-row seat 6 and the baggage placed thereon in a state where excessive behavior is occurring in the automobile 1. In FIG. 12, acceleration is generated leftward in the drawing. The movement sensor 22 detects this acceleration. The upper body of the child whose seated position is fixed by the seatbelt slightly leans in the direction of the acceleration due to this acceleration. The baggage moves in the direction of the acceleration due to this acceleration. The position of the baggage changes in accordance with excessive acceleration.

Figure 13:
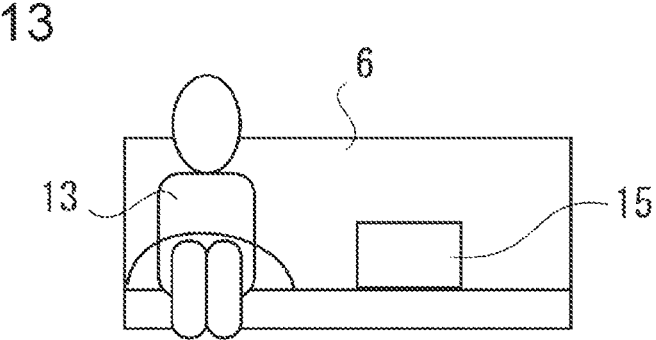
FIG. 13 illustrates positional changes in the child sitting in the rear-row seat and the baggage placed thereon after excessive behavior has occurred in the automobile.

FIG. 13 illustrates positional changes in the child sitting in the rear-row seat 6 and the baggage placed thereon after excessive behavior has occurred in the automobile 1. The position of the child, including the upper body thereof, whose seated position is fixed by the seatbelt has not changed from the position in FIG. 11. In contrast, the position of the baggage has changed from the position in FIG. 11.

The CPU 41 generates positional information about the child and positional information about the baggage based on the vehicle-cabin detection map 50 with respect to the state in FIG. 13.

Then, since the amount of change in the positional information about the child is smaller than the predetermined amount, the CPU 41 updates the in-vehicle-object information stored in the memory 42 to a child in step ST30.

Furthermore, since the amount of change in the positional information about the baggage is larger than or equal to the predetermined amount, the CPU 41 updates the in-vehicle-object information stored in the memory 42 to baggage in step ST29.

Accordingly, for example, even if the baggage is erroneously determined to be a child based on the state in FIG. 11, the in-vehicle-object information can be correctly updated to baggage.

Furthermore, for example, even if the child is erroneously determined to be baggage based on the state in FIG. 11, the in-vehicle-object information can be correctly updated to a child.

Figure 14:
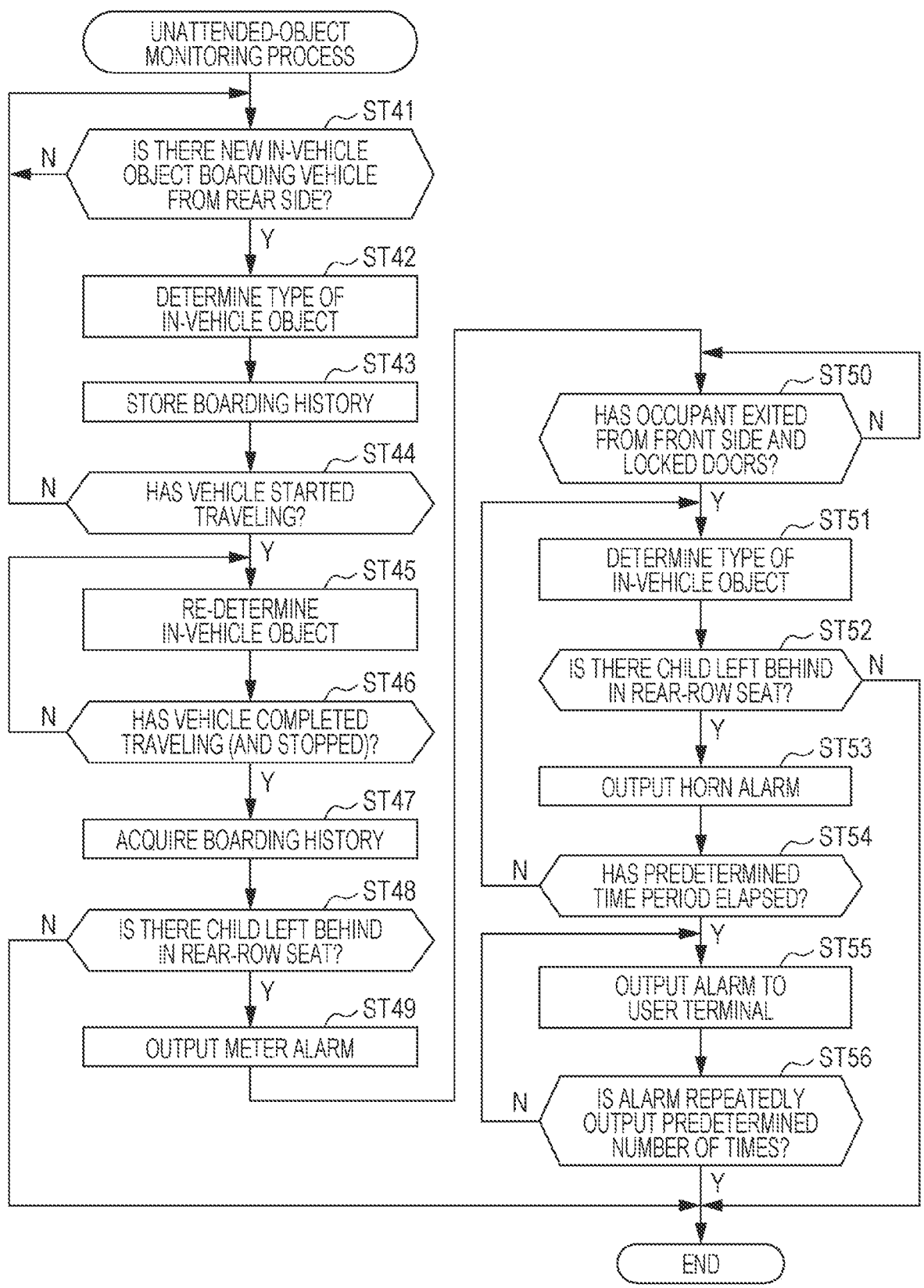
FIG. 14 is a flowchart of an unattended-object monitoring control process executed by the CPU of the in-vehicle-object determination device in FIG. 3.

FIG. 14 is a flowchart of an unattended-object monitoring control process executed by the CPU 41 of the in-vehicle-object determination device 21 in FIG. 3.

The CPU 41 of the in-vehicle-object determination device 21 repeatedly executes the unattended-object monitoring control process in FIG. 14.

In step ST41, the CPU 41 determines whether there is a new in-vehicle object boarding the automobile 1 from the rear side. The CPU 41 may determine whether there is a new occupant on board the rear-row seat 6. It may be determined that a new occupant is on board the rear-row seat 6 based on, for example, detection of opening and closing of a door corresponding to the rear-row seat 6. If there is no new occupant on board the rear-row seat 6, the CPU 41 repeats the process. If there is a new occupant on board the rear-row seat 6, the CPU 41 proceeds to step ST42.

In step ST42, the CPU 41 determines the type of in-vehicle object. The CPU 41 may execute either one of the in-vehicle-object type determination process in FIG. 10 and the in-vehicle-object type determination process in FIG. 8. The CPU 41 determines that the type of in-vehicle object is any one of an adult, a child, and baggage. In addition to executing the in-vehicle-object type determination process with respect to the rear-row seat 6, the CPU 41 may execute the in-vehicle-object type determination process with respect to all the seats including the front-row seats 4 and 5. Moreover, the CPU 41 may execute the in-vehicle-object type determination process with respect to the trunk 7.

In step ST43, the CPU 41 updates a boarding history in accordance with the determination result obtained from the in-vehicle-object type determination process in step ST42, and stores the updated boarding history in the memory 42. If the CPU 41 has executed the in-vehicle-object type determination process with respect to the rear-row seat 6 alone in step ST42, the CPU 41 may add the determination result obtained in step ST42 to the boarding history stored in the memory 42. If the CPU 41 has executed the in-vehicle-object type determination process with respect to all the seats in step ST42, the CPU 41 may entirely overwrite the boarding history stored in the memory 42 based on the determination result obtained in step ST42. Accordingly, information indicating at least the latest on-board state of either of the occupant and baggage in the rear-row seat 6 is stored in the memory 42. Alternatively, information indicating the latest on-board states of all the occupants and baggage in all the seats 4 to 6 and the trunk 7 may be stored in the memory 42.

In step ST44, the CPU 41 determines whether the automobile 1 has completed traveling and stopped. For example, the CPU 41 may determine whether the automobile 1 has completed traveling and stopped based on whether the ignition switch (not illustrated) has been operated for stopping the power source after the traveling of the automobile 1. When the driver 11 is to exit from the automobile 1 after traveling, the driver 11 is to operate the ignition switch. If the ignition switch is not operated after the traveling of the automobile 1, the CPU 41 determines that the automobile 1 has not completed traveling and stopped, and returns to step ST41. The CPU 41 repeats the process from step ST41 to step ST44 until the CPU 41 determines that the automobile 1 has completed traveling and stopped. Accordingly, the information about the boarding history stored in the memory 42 may be updated in correspondence with the latest on-board state in the traveling mode. When the ignition switch is operated after the traveling of the automobile 1, the CPU 41 determines that the automobile 1 has completed traveling and stopped, and proceeds to step ST47 to start an unattended-object monitoring process.

In step ST45, the CPU 41 executes a process for re-determining the attribute of the in-vehicle object during the traveling of the automobile 1. For example, the CPU 41 may execute the process in FIG. 10 for re-determining the attribute of the in-vehicle object.

In step ST46, the CPU 41 determines whether the automobile 1 has completed traveling. For example, if the automobile 1 has stopped such that the detection value of the movement sensor 22 corresponds to a stop, the CPU 41 may determine that the automobile 1 has completed traveling. If the automobile 1 has not completed traveling, the CPU 41 returns to step ST45. Accordingly, the memory 42 accumulatively stores information about each detected in-vehicle object at the time of boarding before the automobile 1 starts traveling in addition to information about each detected in-vehicle object during the traveling of the automobile 1. The information corresponding to each time point contains positional information of each in-vehicle object. Furthermore, the determination of whether each in-vehicle object is either of a child and baggage may be updated, where appropriate, based on latest detection. When the automobile 1 has completed traveling, the CPU 41 proceeds to step ST47.

Accordingly, the CPU 41 serves as a determiner that compares the detection level of a millimeter reflection wave detected by each millimeter-wave sensor with a threshold value while the automobile 1 is stopped, so that the CPU 41 can determine whether there is an in-vehicle object in the vehicle cabin 3 of the automobile 1 and also determine that the type of in-vehicle object is any one of, for example, an adult, a child, and baggage. Moreover, when the behavior of the automobile 1 greatly changes due to the movement of the automobile 1 detected by the movement sensor 22 while the automobile 1 is traveling, the CPU 41 can repeat the in-vehicle-object-type re-determination process based on the magnitude of a positional change of the in-vehicle object. If the CPU 41 has determined that the in-vehicle object is either of a child and baggage in the determination process while the automobile 1 is stopped, the CPU 41 can repeat the determination process with respect to the in-vehicle object, determined to be either of a child and baggage, based on the magnitude of the positional change of the in-vehicle object when the behavior of the automobile 1 greatly changes due to the movement of the automobile 1 detected by the movement sensor 22 while the automobile 1 is traveling. As a result, in this embodiment, even when proper determination is difficult with the determination process executed at the time of boarding, it is expected that the accuracy with respect to the determination of the type of in-vehicle object may be enhanced with the determination process executed while the automobile 1 is traveling.

From step ST47, the CPU 41 starts executing the unattended-object monitoring process on either of a child and baggage after the automobile 1 has stopped. The CPU 41 first acquires the latest boarding history from the memory 42.

In step ST48, the CPU 41 determines whether a child is left behind in the rear-row seat 6 based on the acquired boarding history. If an open-close history, obtained by the door sensor 23, about a boarding door other than the front doors of the automobile 1 before the automobile 1 starts traveling is stored in the boarding history, the CPU 41 may determine that a child has possibly boarded the automobile 1. The boarding history in the memory 42 may include a detection result that is obtained by a detector (not illustrated) other than the door sensor 23 and that indicates a plurality of kinds of operations performed when an occupant exits from the automobile 1. If the boarding history with respect to the rear-row seat 6 includes a child, the CPU 41 determines that a child is left behind in the rear-row seat 6 and proceeds to step ST49. If the boarding history with respect to the rear-row seat 6 does not include a child, the CPU 41 determines that a child is not left behind in the rear-row seat 6 and ends the control process.

In step ST49, the CPU 41 outputs a meter alarm. The CPU 41 causes the liquid display device serving as a meter panel to display an unattended-child alarm screen via the user interface device 25. The driver 11 can recognize a possibility of the child being left behind unattended based on the display on the meter panel that changes in response to an operation performed on the ignition switch when an occupant exits from the automobile 1. By determining that the child is left behind unattended based on the boarding history prior to an exit from the automobile 1 and outputting the alarm in this manner, a possibility of the child being left behind unattended can be recognized from the alarm even if the child is not properly sitting in the rear-row seat 6 at the time of the exit, such as when the child is lying down at the bottom of the rear-row seat 6 or is sleeping in the child seat 14. In this case, the liquid crystal device serving as a meter panel serves as an alarm unit that outputs an alarm to an occupant of the automobile 1. If the child in the vehicle cabin 3 is detected when the occupant exits from the automobile 1, the liquid crystal device serving as a meter panel can output an alarm indicating that the child is left behind unattended to the occupant, such as the driver 11, exiting from the automobile 1. If the child in the vehicle cabin 3 is not detected when the occupant exits from the automobile 1, the liquid crystal device serving as a meter panel does not output the alarm.

In step ST50, the CPU 41 determines whether the doors of the automobile 1 have been locked in addition to determining whether the occupant has exited from the front side. The occupant exits from the automobile 1 by opening and closing the door. When the occupant moves away from the automobile 1, the doors are automatically locked. If the occupant has not exited from the automobile 1 from the front side or if the occupant exited from the automobile 1 has not moved away from the automobile 1 and the doors are not locked, the CPU 41 repeats this determination process. When the occupant moves away from the automobile 1 after exiting from the front side and the doors are locked, the CPU 41 proceeds to step ST51 based on these plurality of kinds of operations performed when the occupant exits from the automobile 1.

In step ST51, the CPU 41 executes the in-vehicle-object type process in FIG. 10. The CPU 41 determines that the type of in-vehicle object is any one of an adult, a child, and baggage based on the detection level.

In this case, the CPU 41 determines that the type of in-vehicle object is either of a child and baggage based on a temporal change in the detection level. In detail, with reference to a detection-level variation immediately after the boarding process, the CPU 41 serves as a determiner that determines that the in-vehicle object is baggage if the detection level of a millimeter reflection wave detected by each of the millimeter-wave sensors 31 to 39 temporally decreases to a predetermined amount or more as compared with the detection-level variation immediately after the boarding process in a state where the automobile 1 has stably stopped, and then becomes stable in the decreased state below the detection-level variation immediately after the boarding process. Furthermore, with reference to the detection-level variation immediately after the boarding process, if the detection level of a millimeter reflection wave detected by each of the millimeter-wave sensors 31 to 39 has become stable in the detection-level variation immediately after the boarding process without decreasing to the predetermined amount or more in a state where the automobile 1 has stably stopped even after some time has elapsed, the CPU 41 determines that the in-vehicle object is a child.

In addition to executing the in-vehicle-object type determination process with respect to the rear-row seat 6, the CPU 41 may execute the process with respect to all the seats including the front-row seats 4 and 5. Moreover, the CPU 41 may execute the in-vehicle-object type determination process with respect to the trunk 7.

In step ST52, the CPU 41 determines whether a child is left behind in the rear-row seat 6 based on the determination result obtained in step ST51. If a child is detected in the rear-row seat 6, the CPU 41 determines that the child is left behind in the rear-row seat 6 and proceeds to step ST53. If a child is not detected in the rear-row seat 6, the CPU 41 determines that a state where a child is left behind unattended in the rear-row seat 6 has already been canceled, and ends the control process.

In step ST53, the CPU 41 outputs a horn alarm. The CPU 41 causes the loudspeaker 27 to output an alarm sound indicating that the child is left behind unattended via the user interface device 25. An occupant, such as the driver 11, exiting from the automobile 1 can recognize a possibility of the child being left behind unattended based on the alarm sound output in response to locking of the doors during the exit. By determining that the child is left behind unattended based on the determination of the type of in-vehicle object actually detected after the exit and outputting the alarm in this manner, a possibility of the child being left behind unattended can be recognized from the alarm even if the child is not properly sitting in the rear-row seat 6 at the time of the exit, such as when the child is lying down at the bottom of the rear-row seat 6 or is sleeping in the child seat 14. If it is determined that the child is left behind in the vehicle cabin 3 when the occupant exits from the automobile 1, the loudspeaker 27 can output an alarm indicating that the child is left behind unattended to the occupant, such as the driver 11, exiting from the automobile 1. If the child in the vehicle cabin 3 is not detected when the occupant exits from the automobile 1, the loudspeaker 27 does not output the alarm.

In step ST54, the CPU 41 determines whether a predetermined time period has elapsed. The predetermined time period may be measured by, for example, the timer 43. The predetermined time period may be, for example, about several seconds to several tens of seconds from the processing timing with reference to any one of step ST44, step ST48, and step ST50. If the predetermined time period has not elapsed, the CPU 41 returns to step ST51. Accordingly, for example, after the doors are locked, the horn alarm is to be repeatedly output within the predetermined time period. An occupant, such as the driver 11, exiting from the automobile 1 can recognize a possibility of the child being left behind unattended based on the repeatedly-output horn alarm. When the CPU 41 serves as a determiner to determine that the in-vehicle object is a child based on the detection level of a millimeter reflection wave detected by each of the millimeter-wave sensors 31 to 39, the CPU 41 repeats the determination process based on the tendency of a temporal change with respect to the detection level of the millimeter reflection wave detected by each of the millimeter-wave sensors 31 to 39. Then, in the repeated determination process, if the detection level of the millimeter reflection wave detected by each of the millimeter-wave sensors 31 to 39 with reference to a detection-level variation immediately after the boarding process temporally decreases to a predetermined amount or more as compared with the detection-level variation immediately after the boarding process in a state where the automobile 1 has stably stopped, and then becomes stable in the decreased state below the detection-level variation immediately after the boarding process, the determination of the in-vehicle object is changed from a child to baggage. Accordingly, for example, after determining that the in-vehicle object is a child at a time point T2 in FIG. 8, the CPU 41 can determine that the in-vehicle object is baggage at a time point T3. When the predetermined time period elapses, the CPU 41 proceeds to step ST55.

In step ST55, the CPU 41 outputs an alarm to the user terminal 29. The CPU 41 transmits an alarm message indicating that the child is left behind unattended to the user terminal 29 via the wireless communication device 24. The user terminal 29 reproduces the received alarm message. An occupant, such as the driver 11, carrying the user terminal 29 and exiting from the automobile 1 can recognize a possibility of the child being left behind unattended based on the alarm output to the user terminal 29 that the occupant is carrying. If the child in the vehicle cabin 3 is detected when the occupant exits from the automobile 1, the wireless communication device 24 serves as an alarm unit that outputs an alarm indicating that the child is left behind unattended to the occupant exiting from the automobile 1. If the child in the vehicle cabin 3 is not detected when the occupant exits from the automobile 1, the wireless communication device 24 does not output the alarm.

In step ST56, the CPU 41 determines whether the alarm is repeatedly output a predetermined number of times in step ST55. If the alarm is not repeatedly output the predetermined number of times in step ST55, the CPU 41 returns to step ST55. Accordingly, the CPU 41 repeatedly executes the output of the alarm in step ST55, so that the alarm indicating a possibility of the child being left behind unattended can be repeatedly output to the occupant, such as the driver 11, carrying the user terminal 29 and exiting from the automobile 1. When the alarm is repeatedly output the predetermined number of times in step ST55, the CPU 41 ends the control process.

Accordingly, if it is determined that the child is left behind in the vehicle cabin 3 when the occupant exits from the automobile 1, the CPU 41 serves as an alarm unit that outputs an alarm indicating that the child is left behind unattended to the occupant exiting from the automobile 1. If it is determined that the child is not left behind in the vehicle cabin 3 when the occupant exits from the automobile 1, the CPU 41 serving as an alarm unit does not output the alarm. In addition, the CPU 41 can output alarms in an orderly sequence from a plurality of alarm output devices, including the user interface device 25 provided in the vehicle cabin 3 of the automobile 1 and the user terminal 29 carried by the occupant exiting from the automobile 1, in accordance with the kinds of operations and the sequence of operations performed by the occupant exiting from the automobile 1.

Accordingly, in this embodiment, each of the millimeter-wave sensors 31 to 39 outputs a millimeter radio wave toward the vehicle cabin 3 of the automobile 1 and detects a millimeter reflection wave from an in-vehicle object, such as either of an occupant and baggage, in the vehicle cabin 3 of the automobile 1. By using a millimeter wave, the detection level of a reflection wave when there is an in-vehicle object, such as an occupant, in the vehicle cabin 3 can be varied from a case where there is no in-vehicle object, such as an occupant, in the vehicle cabin 3. By using a millimeter wave, a child and baggage located behind a blocking object in the vehicle cabin 3 can be detected, so that at least the presence or absence of an in-vehicle object can be detected based on the detection level of a millimeter reflection wave. The CPU 41 determines the type of in-vehicle object in the vehicle cabin 3 of the automobile 1 based on the detection level of the millimeter reflection wave detected by each of the millimeter-wave sensors 31 to 39. Accordingly, the CPU 41 can basically determine that an in-vehicle object possibly present in the vehicle cabin 3 of the automobile 1 is, for example, either of an adult and a child or either of a child and baggage.

However, the detection level of a millimeter reflection wave is not necessarily clearly divided for each type of in-vehicle object. In particular, the difference between the detection level of a millimeter reflection wave from a child and the detection level of a millimeter reflection wave from baggage basically tends to be small, and the magnitude relationship therebetween may be inverted in some cases. For example, the detection level of a millimeter reflection wave from transparent-liquid-containing baggage, such as a plastic bottle containing a liquid, may sometimes be higher than the detection level of a millimeter reflection wave from a child. Therefore, it is difficult to properly determine the type of in-vehicle object by comparing the fixed threshold value set in advance with the detection level of a millimeter reflection wave detected by each millimeter-wave sensor. Therefore, the plastic bottle containing the liquid may erroneously be determined to be a child, or the possibility of the child being erroneously determined to be baggage may increase if the threshold value is increased for preventing the erroneous determination.

Therefore, in this embodiment, instead of completing the in-vehicle-object type determination process by simply comparing the detection level of a millimeter reflection wave with the threshold value, a process for re-determining whether the in-vehicle object is either of a child and baggage is subsequently performed while the automobile 1 is traveling. In detail, the CPU 41 re-determines whether the in-vehicle object is either of a child and baggage based on the magnitude of a positional change of the in-vehicle object when the behavior of the automobile 1 greatly changes due to the movement of the automobile 1 detected by the movement sensor 22. Accordingly, in this embodiment, even in a situation where the difference between the detection level of a millimeter reflection wave from a child and the detection level of a millimeter reflection wave from baggage is small and it is difficult to accurately determine the type of in-vehicle object by simply comparing the detection level of a millimeter reflection wave with the threshold value, it is expected that erroneous determination between a child and baggage with respect to such an in-vehicle object can be reduced.

Accordingly, in this embodiment, the accuracy with respect to the determination of the type of in-vehicle object based on the detection result of the vehicle cabin 3 obtained by using a millimeter radio wave can be enhanced.

In this embodiment, if a child is detected based on a determination result obtained when an occupant exits from the automobile 1, an alarm indicating that the child is left behind unattended is output to the occupant exiting from the automobile 1. Accordingly, in this embodiment, if the child is possibly left behind unattended in the automobile 1 from which the occupant is exiting, the in-vehicle object is determined to be a child as much as possible, so that the alarm indicating that the child is left behind unattended can be output to the occupant exiting from the automobile 1.

In addition, in this embodiment, even if an in-vehicle object is determined to be a child as much as possible in this manner, when an in-vehicle object not determined to be a child is left behind, the alarm is not output to the occupant exiting from the automobile 1. It is possible to prevent the alarm from being output excessively with respect to baggage serving as an in-vehicle object with a very low possibility of being a child.

Although the above embodiment of the disclosure has been described as an example, the embodiment of the disclosure is not limited to that described above, and various modifications and alterations are possible so long as they do not deviate from the embodiment of the disclosure.

For example, in the control system 20 serving as an unattended-occupant determination apparatus of the automobile 1 in the above embodiment, the CPU 41 of the in-vehicle-object determination device 21 executes all of the processes including the control of the millimeter-wave sensors 31 to 39, the determination of the presence and absence of an in-vehicle object and the type thereof, and the determination of whether, for example, a child is left behind unattended.

Alternatively, for example, similar to the in-vehicle-object determination device 21, the other devices 22 to 25 provided in the control system 20 may each have an input-output unit and a CPU that are coupled to the in-vehicle network 26. The CPU of each of these devices 22 to 25 may partially or entirely execute the processes executed by the CPU 41. A plurality of CPUs may operate in cooperation with each other to execute the above-described processes of the CPU 41 in a distributive manner.

In the above embodiment, in a case where the determiner detects a child in the vehicle cabin 3 when an occupant exits from the automobile 1, the alarm unit outputs an alarm indicating that the child is left behind unattended to the occupant exiting from the automobile 1. In a case where the determiner does not detect a child in the vehicle cabin 3 when the occupant exits from the automobile 1, the alarm unit does not output the alarm to the occupant exiting from the automobile 1.

Furthermore, in accordance with the kinds of operations and the sequence of operations performed by an occupant exiting from the automobile 1 and detected by the detector that detects the plurality of kinds of operations, including opening and closing of the doors of the automobile 1, to be performed by the occupant when exiting from the automobile 1, the alarm unit can output alarms in an orderly sequence from a plurality of alarm output devices, including the user interface device 25 provided in the vehicle cabin 3 of the automobile 1 and the user terminal 29 carried by the occupant exiting from the automobile 1.

The control system 20 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the in-vehicle-object determination device 21, the movement sensor 22, the door sensor 23, the wireless communication device 24, the user interface (UI) device 25, and the in-vehicle network 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A vehicle-interior monitoring apparatus for a vehicle, the vehicle-interior monitoring apparatus comprising:
   a millimeter-wave sensor configured to output a millimeter radio wave toward a vehicle cabin of the vehicle and detect a millimeter reflection wave from an in-vehicle object comprising either one of an occupant in the vehicle cabin of the vehicle and baggage in the vehicle cabin of the vehicle;
   a movement sensor configured to detect movement of the vehicle; and
   a determiner processor configured to:
      determine a type of the in-vehicle object in the vehicle cabin of the vehicle based on a detection level of the millimeter reflection wave detected by the millimeter-wave sensor;
      in response to determining that the movement sensor detects the movement of the vehicle and the determined type of the in-vehicle object is either the baggage or a child, assess change in position of the in-vehicle object based on the millimeter reflection wave detected by the millimeter-wave sensor; and
      based on the assessed change in position of the in-vehicle object, re-determine whether the type of the in-vehicle object is either the baggage or the child.

2. A vehicle-interior monitoring apparatus for a vehicle, the vehicle-interior monitoring apparatus comprising:
   a millimeter-wave sensor configured to output a millimeter radio wave toward a vehicle cabin of the vehicle and detect a millimeter reflection wave from an in-vehicle object comprising either one of an occupant in the vehicle cabin of the vehicle and baggage in the vehicle cabin of the vehicle;
   a movement sensor configured to detect movement of the vehicle;
   a processor configured to:
      determine a type of the in-vehicle object in the vehicle cabin of the vehicle based on a detection level of the millimeter reflection wave detected by the millimeter-wave sensor; and
      re-determine that a determined in-vehicle object is either one of the baggage and a child as the occupant based on a positional change of the determined in-vehicle object upon the movement sensor detecting the movement of the vehicle, the determined in-vehicle object being the in-vehicle object of which the processor has determined the type based on the detection level of the millimeter reflection wave,
   wherein the processor is configured to:
      re-determine that the determined in-vehicle object is the baggage in a case where the positional change of the determined in-vehicle object is larger than or equal to a predetermined amount with reference to a position of the determined in-vehicle object before the movement sensor detects the movement of the vehicle, and re-determine that the determined in-vehicle object is a child in a case where the positional change of the determined in-vehicle object is smaller than the predetermined amount.

3. The vehicle-interior monitoring apparatus according to claim 2, wherein while the vehicle is stopped, the processor is configured to determine whether the in-vehicle object is present in the vehicle cabin of the vehicle and determine the type of the in-vehicle object based on the detection level of the millimeter reflection wave detected by the millimeter-wave sensor, and while the vehicle is traveling, the processor is configured to re-determine the type of the determined in-vehicle object based on the positional change of the determined in-vehicle object upon the movement sensor detecting the movement of the vehicle.

4. The vehicle-interior monitoring apparatus according to claim 3, wherein in the case where the processor determines that the in-vehicle object comprises either one of the child and the baggage while the vehicle is stopped, the processor is configured, while the vehicle is traveling, to re-determine the type of the determined in-vehicle object that is determined to be either one of the child and the baggage based on the positional change of the determined in-vehicle object upon the movement sensor detecting the movement of the vehicle.

5. A vehicle-interior monitoring apparatus for a vehicle, the vehicle-interior monitoring apparatus comprising:

a millimeter-wave sensor configured to output a millimeter radio wave toward a vehicle cabin of the vehicle and detect a millimeter reflection wave from an in-vehicle object comprising either one of an occupant in the vehicle cabin of the vehicle and baggage in the vehicle cabin of the vehicle;

a movement sensor configured to detect movement of the vehicle;

a processor configured to:

determine a type of the in-vehicle object in the vehicle cabin of the vehicle based on a detection level of the millimeter reflection wave detected by the millimeter-wave sensor; and re-determine that a determined in-vehicle object is either one of the baggage and a child as the occupant based on a positional change of the determined in-vehicle object upon the movement sensor detecting the movement of the vehicle, the determined in-vehicle object being the in-vehicle object of which the processor has determined the type based on the detection level of the millimeter reflection wave, wherein while the vehicle is stopped, the processor is configured to determine whether the in-vehicle object is present in the vehicle cabin of the vehicle and determine the type of the in-vehicle object based on the detection level of the millimeter reflection wave detected by the millimeter-wave sensor, and wherein while the vehicle is traveling, the processor is configured to re-determine the type of the determined in-vehicle object based on the positional change of the determined in-vehicle object upon the movement sensor detecting the movement of the vehicle.

6. The vehicle-interior monitoring apparatus according to claim 5, wherein in the case where the processor determines that the in-vehicle object comprises either one of the child and the baggage while the vehicle is stopped, the processor is configured, while the vehicle is traveling, to re-determine the type of the determined in-vehicle object that is determined to be either one of the child and the baggage based on the positional change of the determined in-vehicle object upon the movement sensor detecting the movement of the vehicle.

* * * * *